Oct. 1, 1963 F. X. KANAMULLER 3,105,964

MAGNETIC HEAD POSITIONING SYSTEM

Filed Feb. 1, 1960 2 Sheets-Sheet 1

INVENTOR.
FRANZ X. KANAMULLER

BY Edward M Harrell

Oct. 1, 1963 F. X. KANAMULLER 3,105,964

MAGNETIC HEAD POSITIONING SYSTEM

Filed Feb. 1, 1960 2 Sheets-Sheet 2

INVENTOR.
FRANZ X. KANAMULLER
BY Edward M. Fassell

United States Patent Office 3,105,964

Patented Oct. 1, 1963

3,105,964

MAGNETIC HEAD POSITIONING SYSTEM

Franz X. Kanamuller, Glenside, Pa., assignor to Sperry Rand Corporation, New York, N.Y., a corporation of Delaware Filed Feb. 1, 1960, Ser. No. 5,873
13 Claims. (Cl. 340—174.1)

This invention relates to magnetic heads, and more particularly, to means for lowering and raising such magnetic heads towards and away from a rotatable magnetic drum.

The use of magnetic drums for storage devices is well known. Such magnetic drums generally include mass storage of data in the form of magnetized areas on the surface of the drums in the form of binary coded signals. A portion of a drum's surface which passes beneath a magnetic reading or writing head is called a track. A single magnetic drum may include as many as one thousand or more tracks. To provide random access quickly to stored information, it is often desirable to use a single magnetic head for reading or writing information from a number of tracks on a drum. In these cases, it is therefore necessary to move the magnetic head to precisely position it over a selected track before the reading or writing operation is commenced.

In many applications, magnetic heads are air floated over the drum surfaces during operation. Air floating a magnetic head permits the head to be adjusted to maintain a smaller and more constant head-to-drum clearance during operation. Force due to the pressure in the wedge of air between the head and drum caused by the relative motion of the bounding surface and viscosity of air keeps the head off the drum. The force produced by the air is generally resisted by the force of a load spring that tends to put the head in contact with the drum. The forces produced by the air and the load spring must be properly balanced to provide efficient operation. Compensation for physical distortions of the magnetic drum is provided through the use of air floated magnetic heads because the head-to-surface spacing is maintained relatively constant. The distortions within the drum may be from irregularities in the distance between the drum axis and its surface or from axial irregularities of the drum, i.e. changes in the surface regularities at right angles to the peripheral or circular direction of the drum.

In order for a system involving an air floating magnetic head to operate efficiently, it is necessary that the magnetic head be lowered towards the drum at some predetermined landing angle and parallel to the axis of the drum before the flying operation starts. This landing angle and parallel relationship must be maintained during raising or lowering the magnetic head to assure that the magnetic head does not strike against the magnetic drum to cause damage to either the head or the drum. After the magnetic head is properly lowered, it is then necessary to permit the head to be air floated freely over the drum surface.

It is an object of this invention to provide a head landing mechanism in which the likelihood of damage to a head or landing surface during a landing or rising operation is eliminated.

It is a further object of this invention to provide an improved head landing mechanism for maintaining the head at a fixed angle during a landing or rising operation.

It is still a further object of this invention to provide an improved head landing mechanism for maintaining the head parallel to the axis of a drum during a landing or rising operation.

It is still a further object of this invention to provide an improved head landing mechanism in which the head is free to move at a flying angle with respect to a drum surface during normal operation and is maintained at a predetermined fixed angle during a landing or rising operation.

It is still a further object of this invention to provide an improved head lowering mechanism in which the landing angle and parallel relationship of the head may be adjusted.

It is still a further object of this invention to provide a single mechanism for controlling the landing and rising operation of a pair of heads.

In accordance with the present invention, a mechanism for lowering and raising a magnetic head with respect to a rotating magnetic drum is provided. The magnetic head is held at a fixed angle and parallel to the axis of the drum by biasing means during the lowering and raising of the head to and from the surface of the drum. A mechanism operates to reduce the pressure produced by the biasing means when the magnetic head is positioned to ride over the surface of the magnetic drum to permit the positioning of the head to be controlled by air pressure between the head and rotating drum surface. Means for adjusting the position at which the head is held during a lowering or raising operation are provided.

Other objects and advantages of the present invention will be apparent and suggest themselves to those skilled in the art from a reading of the following specification and claims in conjunction with the accompanying drawings, in which:

As previously indicated, in order to fly a magnetic head, the magnetic head must first be lowered towards the surface of a rotating drum and be properly positioned initially so that it can begin flying. Without this initial positioning, the magnetic head may be at various different angles or non-parallel to the drum axis and crash landings between the head and the drum would tend to result.

Figures 1, 2:
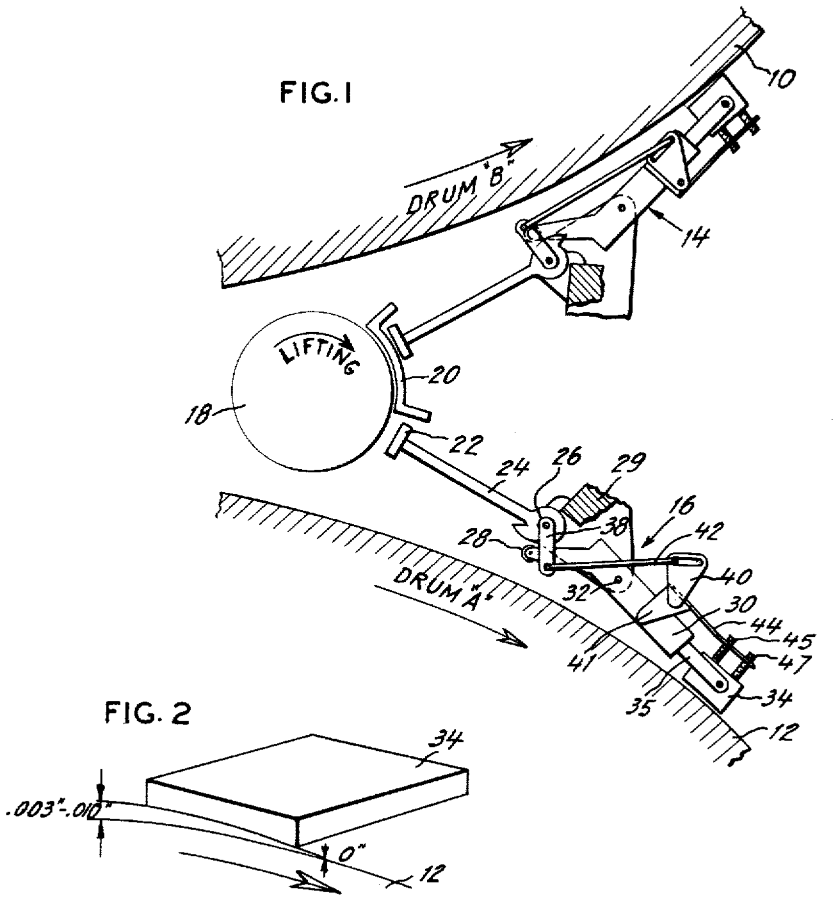
FIGURE 1 is a sketch illustrating a mechanism in accordance with the present invention.
FIGURE 2 is a sketch illustrating a landing angle position of a magnetic head used in accordance with the present invention.

Referring particularly to FIGURE 1, a pair of magnetic drums 10 and 12 are associated with a pair of magnetic head assemblies 14 and 16, respectively. Since the assemblies 14 and 16 are identical in operation, only the assembly 16 and its associated magnetic drum 12 will be described.

The present embodiment of the invention involves the use of a single carriage mechanism to control the positioning of two separate magnetic head assemblies. This arrangement has proven highly economical in many applications because a major item of cost in magnetic head positioning systems involves the carriage positioning mechanism.

Consider first a situation in which a reading or writing operation has been completed and it is desired to lift the head from the drum 12. A shaft element 18 is adapted to be rotated through a relatively small angular distance in the direction indicated by the arrow when it is actuated by a motor or other sources of driving power (not illustrated). A bail element 20 having two protruding end portions is attached longitudinally along the length of the shaft element 18. When the element 18 is rotated a predetermined angle, the protruding portions of the element 20 engage a pair of wheels including the wheel 22 associated with a linkage mechanism forming part of the assembly 16. Engagement of the wheel 22 by the bail element 20 causes the wheel 22 to be moved in a counterclockwise direction. The wheel 22 is adapted to ride along the bail element 20 in an axial direction to the shaft element 18. This avoids undue friction between the bail element 20 and the wheel 22 if the assembly 16 is moving axially to the shaft element 18, as may occur accidentally or during final positioning of the magnetic head.

A bail follower 24 connects the wheel 22 to a cam 26. Movement of the wheel 22 by the bail element 20 in a counterclockwise direction causes the cam 26 to be likewise moved in a counterclockwise direction to engage a cam follower 28. The cam follower 28 is attached to a magnetic head carrier member 30, which is pivotally mounted to a carriage 29 (partly illustrated) at a pivot point 32.

When the cam 26 is moved in a counterclockwise direction to engage the cam follower 28, the magnetic head carrier member 30 is rotated at its pivot point 32 in a counterclockwise direction. A magnetic head 34, attached to the member 30 through a holding bracket or frame member 35, is caused to be moved in a counterclockwise direction and is raised away from the surface of the drum 12.

Consider now the biasing arrangement which keeps the magnetic head 34 at a predetermined landling angle during the rising and lowering operations. A bias pivot link 40 is solidly attached to the magnetic head carrier member 30 by means of an element 41. When the shaft element 18 is rotated clockwise a predetermined angle, the bail follower element 24 is rotated counterclockwise. The cam 26 and a cam arm 38 are also rotated counterclockwise. A link 42, connecting the cam arm 38 with the bias pivot link 40, is caused to move to the right thereby allowing the bias pivot link 40 to rotate clockwise. A biasing arm 44 is connected at one end to the bias pivot link 40 and at its other end to a pair of biasing screw members 45 and 47. The screw members 45 and 47 are disposed to engage the magnetic head 34 during the rising and lowering operations and to become disengaged from the magnetic head when the magnetic head is flying across the surface of the drum 12, as drum 12, as during a reading or writing operation. When the biasing arm 44 is moved clockwise by the pivot link 40, the screw members 45 and 47 are urged against the magnetic head 34 to maintain it at some predetermined fixed angle and parallel to the drum 12 with the position of the head being dependent upon the setting of the screw members 45 and 47.

In summary, it has been seen that the shaft element 18 rotates clockwise during the lifting operation. The cam 26 and the cam arm 38 likewise rotate clockwise. The cam arm 38 transmits its motion by way of the link 42 to the biasing arm 44. However, the cam 26 must move a slight distance, between it and the cam follower 28, before the cam 26 can push down the head carrier 30 which results in the lifting of the magnetic head 34 from the drum 12. Thus, it is seen that the bias plane controls the magnetic head 34 before it is lifted from the drum surface. If this were not true, the magnetic head 34 could easily swivel within its frame member 35 and strike the drum.

Considering the landing operation of the magnetic head 34, as when the head is being lowered into position over a selected track of the drum prior to starting a reading or writing operation, the operation reverse to that just described is true. The shaft element 18 is rotated in a counterclockwise direction to cause the bail element 20 to be moved away from the wheel 22.

The bail follower 24 rotates clockwise to cause the cam 26 to also move clockwise. Continued counterclockwise rotation of the shaft element 18 caused the cam 26 to be rotated clockwise until it is free of the cam follower 28. At this point, the cam arm 38 becomes effective to move the bias arm 44 in a counterclockwise direction to cause the pressure exerted by the biasing screws 45 and 47 to be removed from the top of the magnetic head 34. The magnetic head 34 is now free to fly with its exact position being determined to a great extent upon the air pressure between the head 34 and the drum 12.

It is thus seen that the magnetic head 34 is maintained at a predetermined fixed angle and parallel to the drum 12 during the landing and rising operations and is pivotally held in a relatively free position within its frame member while flying over the drum. The arrangement illustrated eliminates the likelihood that the magnetic head 34 will swivel and crash into the drum 12 to thereby cause damage to the head or drum during a landing or rising operation.

Additional features found in most conventional types of head mechanisms are not illustrated in detail in FIGURE 1. For example, a load spring or other biasing means to produce pressure against the head 34 which balances the air pressure exerted from under the head is not shown. It is recognized, however, that the last mentioned load spring must be separately and independently adjusted. The final adjustment of this last mentioned load spring will not affect the initial flying angle of the magnetic head 34.

Referring particularly to FIGURE 2, the initial angle of attack between the magnetic drum 12 and the magnetic head 34 is illustrated. It is seen here that the rear edge of the magnetic head 34 (i.e., the edge towards the right in the drawing) is extremely close to the magnetic drum 12. The leading edge (the left edge in the drawing) of the magnetic head 34 is also parallel to the drum axis but may be spaced some predetermined distance from the drum surface. As may be seen more clearly in FIGURE 3, adjustment of various screws may be employed to determine the position of the head 34 during the rising and lowering operations as described in connection with FIGURE 1.

Figure 3:
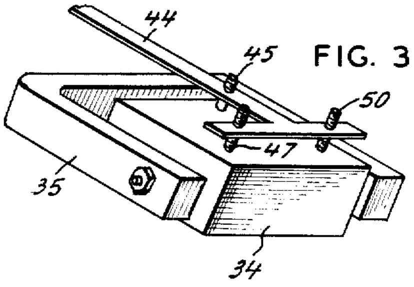
FIGURE 3 is an enlarged detailed view of one type of a magnetic head and biasing means which may be embodied in the mechanism illustrated in FIGURE 1.

Referring particularly to FIGURE 3, the biasing arm 44 includes three screws 45, 47 and 50 which may be adjusted to set up the initial position which the magnetic head 34 must take in order to begin flying. The two screws 47 and 50 to the right are positioned on a line parallel to the axis of the magnetic drum and may be adjusted to assure that the head 34 is parallel to the drum during a lowering or rising operation. The single screw 45 may be adjusted to set up the angle of attack.

It is noted that the frame member 35 to which the head 34 is pivotally mounted may be connected to a shaft or other means (not illustrated in detail) attached to the main body of the assembly to permit the head to be rotated to compensate for axial irregularities in the drum. Thus, adjustment means to keep the head parallel to the drum, as well as keeping it at the correct landing angle during the rising and landing operations, must be employed.

Figure 4:
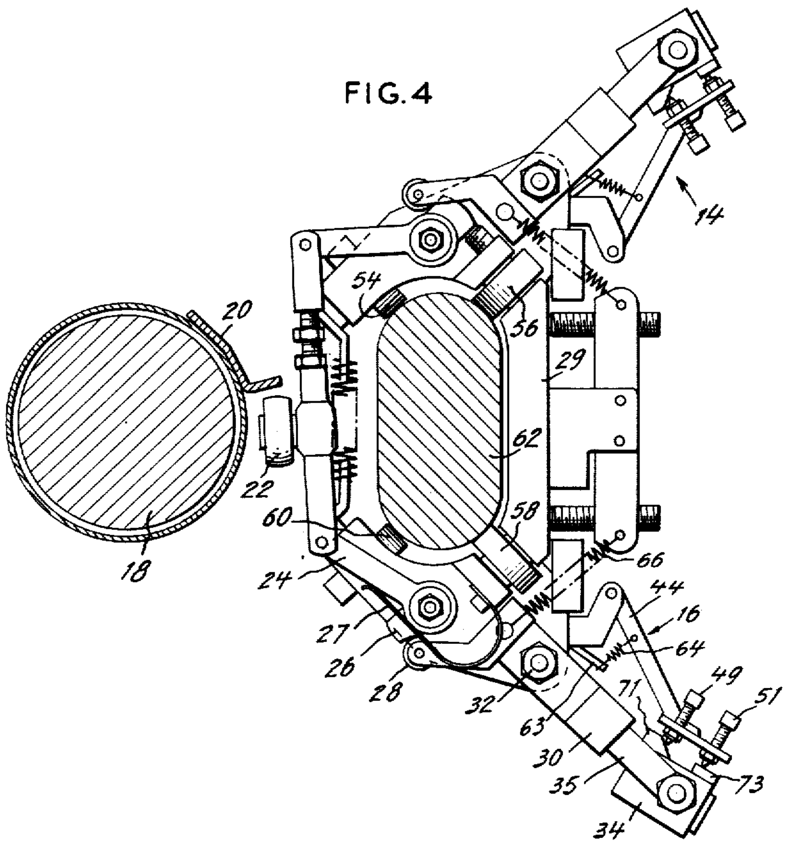
FIGURE 4 is a detailed view, partly in cross section, of a magnetic head positioning mechanism in accordance with the present invention.
Figure 5:
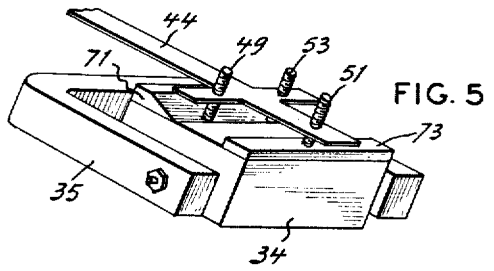
FIGURE 5 is an enlarged view of the magnetic head illustrated in FIGURE 4.

Referring particularly to FIGURES 4 and 5, there is illustrated a detailed view of an embodiment of the present invention similar to many respects to that illustrated in FIGURE 1. The magnetic head assemblies 14 and 16 are attached to the carriage 29. The carriage 29 includes a plurality of rollers 54, 56, 58 and 60 which are adapted to ride on a rail 62 to position the magnetic heads over selected portions of a pair of magnetic drums. In a practical embodiment, the carriage 29 may be connected to a pulley or to other suitable positioning means. The means for positioning the carriage over selected tracks of magnetic drums are not illustrated.

Consider first the operation when the head 34 is being lowered toward the surface of a drum. The shaft element 18 is rotated counterclockwise a predetermined angular distance, and the bail element 20 becomes disengaged from the wheel 22. The link element 24 is forced up by a spring 27 and the cam 26 becomes disengaged from the cam follower 28.

Movement of the cam follower 28 in a clockwise direction causes the carrier member 30 to be pivotally moved in a clockwise direction around the pivot point 32. An element 63, fixedly mounted to move with the carrier member 30, is caused to be moved clockwise to thereby cause the biasing arm 44, and consequently the screws 49, 51 and 53, to be moved to the left. The elements directly associated with the magnetic head 34 may be seen more clearly to referring to FIGURE 5. The screws 49 and 53, originally set at the lower portion of a cam element 71, are moved up the tapered portion of the cam element 71 and the screw 51 is moved to the left while continuing to engage an element 73. Continued movement to the left causes the screws 49 and 53 to leave the cam element 71 thereby substantially removing tension or pressure from the head 34. The single screw 51 continues to ride on the element 73 without exerting any substantial pressure against the head 34 and permitting the head 34 to be moved to different angles dependent upon the air pressure involved.

The head and screw adjustment arrangement of FIGURES 4 and 5 is somewhat different than that illustrated in FIGURES 1 and 3. Whereas FIGURES 1 and 3 illustrate an arrangement having two aligned screws 47 and 50 toward the front of the head and a single screw 45 toward the rear, FIGURES 4 and 5 illustrate an arrangement in which a pair of screws 49 and 53 are disposed toward the rear of the head 34 and a single screw 51 is disposed toward the front of the head 34. Adjustment of the screw 51 controls the angle of the magnetic head 34 during the rising and lowering operations and the adjustment of the screws 49 and 53 controls the parallel relationship of the head 34 with respect to the drum. These screws are necessary, as has been pointed out, to keep the head 34 from rotating since the frame 35 may be connected to be pivoted or rotated within means not illustrated or described in detail. A spring member 64 is connected between the element 63 and the link 44 to urge the link 44 in a downward direction.

When the head 34 is raised from a drum, a reverse operation to that just described takes place. When the shaft 18 is rotated clockwise, the bail element 20 forces the wheel 22 to be moved in a downward direction. The link element 24 is moved counterclockwise and the cam 26 engages the cam follower 28. The carrier member 30 is rotated counterclockwise about its pivot point 32. The link 44 is caused to be moved to the right forcing the screws 49 and 53 to ride down the tapered portion of the cam element 71 and the screw 51 to be moved to the right along the top of the element 73. As the head 34 continues to be moved upward, the screw 49 engages the bottom portion of the tapered element 71. At this point, the head 34 is maintained at a relatively fixed angle and parallel to the drum by the screws 49, 51 and 53. This position is maintained as the head continues to be raised away from the drum.

It is noted that the feature involving the tapered cam element 71 permits the angle of the head 34 with respect to the drum to be maintained relatively constant while the head is being raised or lowered. For example, if the tapered cam element 71 were not present, the carrier 30, moving about its pivot point 32, would tend to change the relative angle between the drum and the head. The tapered cam element compensates for these slight relative angular changes during the head lowering or raising operation.

During a normal reading or writing operation, as previously indicated, it is desirable to maintain a predetermined pressure against the magnetic head which opposes the upward pressure caused by the air flow between the magnetic head and the drum. A load spring member 66 provides this pressure against the magnetic head 34. The tension produced by the load spring 66 tends to force the carrier 30 to be moved clockwise about its pivot point 32. Means for varying the amount of tension produced by the spring 66 may, of course, be included.

Figure 6:
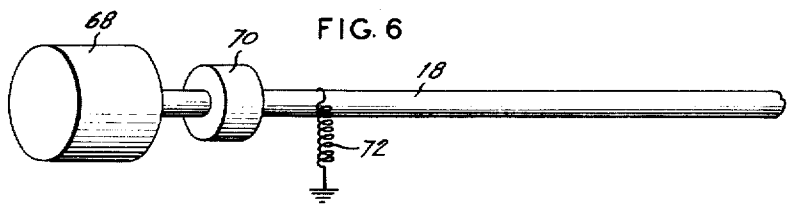
FIGURE 6 is a sketch illustrating an additional feature of the present invention.

In many operations, the shaft 18 for performing the rising or lowering operation is caused to be moved by a motor and clutch arrangement such as illustrated in FIGURE 6. This embodiment illustrates an additional protective feature of the present invention which may be incorporated into the system described to prevent damage to the magnetic head or drum in the even of power failure. A motor 68 is connected to the shaft 18 through a clutch mechanism 70. A spring 72 is provided to maintain a constant pressure on the shaft 18 in the direction necessary to lift the magnetic head from the drum in the event that the motor 68 becomes inoperative. When the clutch mechanism 70 is engaged, as during normal operation, the motor 68 causes the shaft 18 to be rotated to counteract the tension exerted by the spring 72. Operation of the motor 68 causes the magnetic head to be lowered to the flying position. If the power to the motor fails, the spring 72 takes control and rotates the shaft 18, which in turn raises the magnetic head from the drum.

The present invention has provided a relatively simple means for eliminating the likelihood of damage to a head or drum by maintaining a magnetic head in a fixed position during rising and landing operations. This is achieved through an independent mechanism which does not affect the operation or adjustments of other parts in the system. Relatively simple means are provided to adjust the fixed angular position of the magnetic head in the event that different environmental conditions, such as varying drum speeds, require different landing angles for the magnetic head.

What is claimed is:

1. A mechanism for raising and lowering a head member with respect to a drum comprising a frame member for pivotally holding said head member, means for adjusting the angle of said head member with respect to said frame member, biasing means to provide tension for maintaining said head member substantially at said adjusted angle when said head is being raised or lowered with respect to said drum, and means for removing tension provided by said biasing means to permit relatively free movement of said head member within said frame member while said head member is in a lowered position.

2. A mechanism as set forth in claim 1 wherein additional adjustable means are provided to maintain said head member in a substantially parallel relationship with respect to said drum, said biasing means providing tension for maintaining said parallel relationship when said head is being raised or lowered with said tension being removed when said head member is in a lowered position.

3. A mechanism for lowering and raising a head member with respect to a drum comprising a carriage for carrying said head member over a selected portion of said drum, an assembly for pivotally holding said head member, means for adjusting the angle and parallel relationship of said head member with respect to said assembly, a linkage mechanism connected between said assembly and said carriage, means for actuating said linkage mechanism to lower or raise said head member with respect to said drum, biasing means included in said linkage mechanism disposed to exert a pressure against said head member to maintain said head member substantially at said adjusted angle with respect to said assembly when said head member is being lowered toward or raised away from said drum, and means for removing pressure provided by said biasing means from said head member when said head member is in a lowered position with respect to said drum to permit said head member to be pivotally moved within said assembly.

4. A flying head mechanism for lowering and raising a head member with respect to a magnetic drum comprising a carriage for positioning said head member over a selected portion of said magnetic drum, a linkage mechanism connected between said head member and said carriage, said head member being pivotally mounted to said linkage mechanism, an element for actuating said linkage mechanism to lower or raise said head member with respect to said magnetic drum after said carriage has been positioned, biasing means associated with said head member, means to actuate said biasing means to exert a pressure to maintain said head member in a relatively fixed position with respect to said linkage mechanism when said head member is being lowered toward or raised away from said magnetic drum, and means for actuating said biasing means to remove pressure from said head member to permit said head member to be pivotally moved within said linkage mechanism when said head member is in a lowered position over said magnetic drum.

5. A flying head mechanism as set forth in claim 4 wherein the position of said head member in a lowered position is controlled by air pressure between said magnetic drum and said head member resulting from the relative movement of said magnetic drum with respect to said head member.

6. A mechanism for simultaneously lowering and raising a pair of head members with respect to a pair of magnetic drums comprising a carriage for simultaneously positioning said pair of head members, a linkage mechanism connected between said head members and said carriage, means for movably mounting said head members to said linkage mechanism, means for actuating said linkage mechanism to lower or raise said head members with respect to said drum members, biasing means included in said linkage mechanism disposed to exert pressure against said head members to maintain said head members at relatively fixed angles with respect to said linkage mechanism when said head members are being lowered or raised, and means for removing pressure provided by said biasing means from said head members when said head members are in lowered positions with respect to said magnetic drums.

7. A mechanism as set forth in claim 6 wherein the pressure exerted by said biasing means maintains said pair of head members substantially parallel to said pair of magnetic drums when said head members are being lowered or raised.

8. A mechanism for lowering and raising a head member with respect to a drum comprising a carriage for carrying said head member over a selected portion of said drum, a linkage mechanism connected between said head member and said carriage, means for pivotally mounting said head member to said linkage mechanism, means including a movable shaft driven by a motor for actuating said linkage mechanism to lower or raise said head member with respect to said drum member, a spring member for moving said shaft to cause said head member to be raised from said drum when said motor is inoperative, biasing means included in said linkage mechanism disposed to exert pressure against said head member to maintain said head member at a substantially fixed angle while said head member is being lowered toward or raised away from said drum, and means for removing pressure provided by said biasing means from said head member when said head member is in a lowered position with respect to said drum.

9. A mechanism for lowering and raising a head member with respect to a drum comprising a carriage for carrying said head member to a selected portion of said drum, said head member including a tapered section, a frame member for pivotally holding said head member, a link element, a plurality of adjustable screws included in said link element disposed to engage said head member to control the relative position of said head member with respect to said frame member, some of said adjustable screws being disposed to ride up and down on the tapered portion of said tapered element during a raising or lowering of said head member, a linkage mechanism connected between said frame member and said carriage, means for actuating said linkage mechanism to lower or raise said head member with respect to said drum member, said adjustable screws included in said link member being disposed to exert a pressure against said head member to maintain said head member substantially at an adjusted position with respect to said frame member when said head member is being lowered toward or raised away from said drum, and means for relieving pressure caused by said screws from said head member when said head member is in a lowered position with respect to said drum to permit said head member to be pivotally moved within said frame member.

10. A mechanism as set forth in claim 9 wherein said plurality of adjustable screws include two screws disposed to ride on the tapered section of said head member, said tapered section being disposed toward the trailing edge of said head member, and a third screw disposed to ride on an aligned section disposed on the leading edge of said head member.

11. A mechanism as set forth in claim 10 wherein said two screws are removed from said tapered section of said head member when said head member is riding over a selected portion of said drum.

12. A mechanism as set forth in claim 11 wherein said means for actuating said linkage mechanism comprises a shaft, a motor for driving said shaft, and biasing means associated with said shaft to urge said shaft to be moved to lift said head member from said drum member when said motor is inoperative.

13. A mechanism as set forth in claim 11 wherein a single linkage mechanism is actuated to lower or raise a pair of head members over selected portions of a pair of drums.

References Cited in the file of this patent

UNITED STATES PATENTS

| | | |
|---|---|---|
| 2,772,135 | Hollabaugh et al. | Nov. 27, 1956 |
| 2,950,354 | Hohnecker | Aug. 23, 1960 |
| 3,005,676 | Best et al. | Oct. 24, 1961 |

UNITED STATES PATENT OFFICE
CERTIFICATE OF CORRECTION

Patent No. 3,105,964 October 1, 1963

Franz X. Kanamuller

It is hereby certified that error appears in the above numbered patent requiring correction and that the said Letters Patent should read as corrected below.

Column 3, line 32, for "landling" read -- landing --; lines 48 and 49, strike out "as drum 12,"; column 4, line 64, for "similar to" read -- similar in --; column 6, line 14, for "even" read -- event --.

Signed and sealed this 21st day of April 1964.

(SEAL)
Attest:

ERNEST W. SWIDER
Attesting Officer

EDWARD J. BRENNER
Commissioner of Patents